United States Patent [19]

Nitta

[11] Patent Number: 5,011,194
[45] Date of Patent: Apr. 30, 1991

[54] FLEXIBLE PIPE CONNECTING DEVICE FOR HIGH TEMPERATURE FLUID

[75] Inventor: Shigemitsu Nitta, Kakogawa, Japan

[73] Assignee: Kawasaki Jukogyo Kabushiki Kaisha, Japan

[21] Appl. No.: 417,271

[22] Filed: Oct. 5, 1989

[30] Foreign Application Priority Data

Oct. 8, 1988 [JP] Japan .............. 63-131991[U]

[51] Int. Cl.⁵ .............................................. F16L 53/00
[52] U.S. Cl. .................... 285/41; 285/133.1; 285/224; 285/227; 285/229; 285/351
[58] Field of Search ............ 285/41, 226, 227, 229, 285/133.1, 224, 351

[56] References Cited

U.S. PATENT DOCUMENTS

| | | |
|---|---|---|
| 2,821,414 | 1/1958 | Jensen .................................. 285/228 |
| 4,045,056 | 8/1977 | Kandakov et al. ................. 285/226 |
| 4,194,460 | 3/1980 | Sato . |
| 4,512,148 | 4/1985 | Jacobson . |
| 4,685,292 | 8/1987 | Brigham . |
| 4,693,079 | 9/1987 | Wuensche . |
| 4,819,965 | 4/1989 | Press et al. ........................ 285/351 |
| 4,854,611 | 8/1989 | Press ................................... 285/226 |

Primary Examiner—Neill R. Wilson

[57] ABSTRACT

The present invention relates to a pipe fitting device which connects pipes that flow a high temperature fluid such as engine exhaust gas. The device includes a first cylindrical block, a second cylindrical block and a follower ring disposed between a ring portion of the first cylindrical block and an edge member of an opening of a second cylindrical block. A spring pushes the follower ring to the second cylindrical block side. Flexible connection sleeves connect the flanges of the first cylindrical block and the second cylindrical block and through holes are drilled into the first and second cylindrical blocks.

3 Claims, 6 Drawing Sheets

FLEXIBLE PIPE CONNECTING DEVICE FOR HIGH TEMPERATURE FLUID

FIELD OF THE INVENTION AND RELATED ART STATEMENT

The present invention relates to a pipe fitting device which connects pipes that flow a high temperature fluid such as engine exhaust gas and dynamically dislocate to each other in longitudinal and lateral directions at the connecting point.

For example, an exhaust gas discharge system in which an exhaust gas expansion chamber is connected to an exhaust gas pipe discharging engine exhaust gas is required not only for the exhaust gas not to leak out but also to absorb vibration of the engine at the connection point, thus preventing the vibration from being transmitted to the successive exhaust devices.

Figure 12:
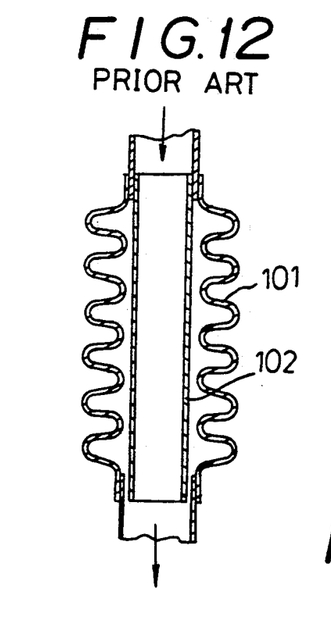
FIGS. 12 to 14 are sectional views showing pipe fitting devices according to the prior art.
Figure 13:
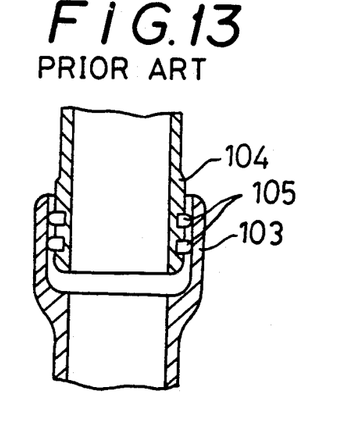
Figure 14:
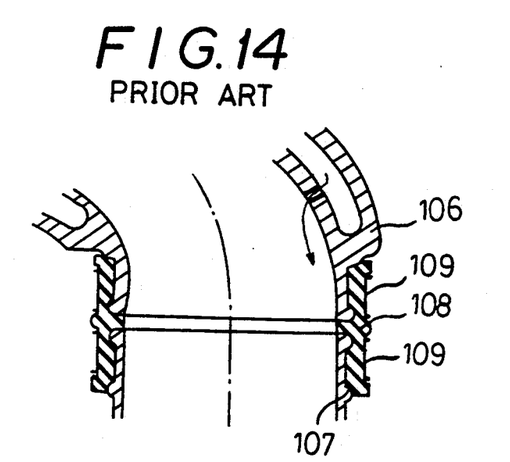

So far there have been known such conventional pipe fittings as follows:

(1) The flexible metal tube 101 (FIGS. 11A, 11B and 11C) in which a thin metal sheet is formed into a bellows;

(2) The flexible metal tube 101 in which a smaller diameter tube 102 is inserted with a radial gap (FIG. 12);

(3) The pipe fitting (FIG. 13) in which one pipe is expanded at one end, and the other pipe 104 is inserted into the expanded end 103. Seal rings 105 are provided between the inner circumferential surface of the expanded portion 103 and the outer circumferential surface of the pipe 104;

(4) One pipe 106 and the other pipe 107 are disposed with a gap. A connection sleeve 108 of heat resistant rubber are fixed to both pipes 106 and 107 with a tightening ring 109 so as to cover both ends of the pipes 106 and 107. Cooling water is passed through the connection sleeve 108 to cool it (FIG. 14). Examples having such configuration are disclosed in U.S. Pat. Nos. 4,194,460 and 4,693,079.

Figure 11A:
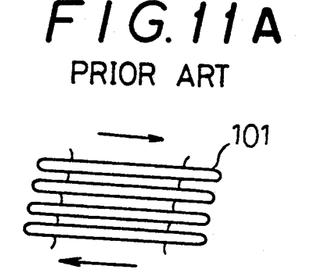
FIGS. 11A, 11B and 11C are sketches showing various states under deformation of a flexible metal tube.
Figures 11B, 11C:
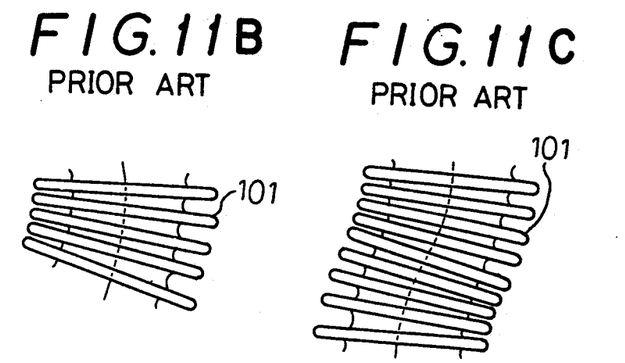

The above metal tube 101 in (1) can dislocate to a large degree in a longitudinal direction but quite small in a lateral direction (See FIG. 11A). As a result, to absorb a certain degree of lateral dislocation at the connection portion, the metal tube 101 must be long (FIG. 11C). For this reason, the connection portion becomes longer. Accordingly, a relatively large space or long distance is necessary. Further, since the inside of the metal tube 101 is exposed to high temperature exhaust gas, the metal tube 101 tends to deteriorate, thus resulting in a relatively short service life; The pipe fitting device in (2) which has inner tube 102 can prevent the high temperature exhaust gas from being in direct contact with the metal tube 101, but has only a limited lateral dislocation due to the interference of the inner tube 102 even with a longer metal tube 101; The pipe fitting device in (3) cannot dislocate much in a lateral direction because it depends only on the dislocation of the seal ring 105, and besides since the seal ring 105 cannot always seal exhaust gas completely, the gas may leak out of the pipe fitting; The pipe fitting device in (4) can function to disrupt engine vibration, but cannot absorb a great relative dislocation.

OBJECT AND SUMMARY OF THE INVENTION

To solve the above-mentioned problems, an object of the invention is to provide a pipe fitting device which has an excellent thermal durability and long service life, can seal high temperature fluid such as exhaust gas, is short and compact, and yet can absorb longitudinal and lateral dislocation and can be easily connected even with a certain degree of inclination between the center lines of pipes.

To achieve the above-described object, three inventions are proposed here:

The first invention is a pipe fitting device comprising:

a first cylindrical block (2) in which a ring portion (24) projects out on a tip end of a flange (21) formed on one pipe end side;

a second cylindrical block (3) which has an opening (34) incorporating with play the ring portion (24) of said first cylindrical block (2) close to the tip end of a flange (31) formed on the other pipe end side;

a follower ring (5) which is disposed between the ring portion (24) of said first cylindrical block (2) and the opening (34) of said second cylindrical block (3), in contact with the outer circumferential surface of the ring portion (24) of the first cylindrical block (2) and has a bent end portion (51) in sliding contact with a edge member end surface of the opening (34) of the second cylindrical block (3);

a spring (7) which pushes said follower ring (5) to the second cylindrical block (3) side;

flexible connection sleeves (9, 8) which respectively couple the flanges (21, 31) of said first cylindrical block (2) and the second cylindrical block (3), as well as the ring portion (24) of the first cylindrical block (2) and the edge member end portion of the opening (34) of the second cylindrical block (3); and through holes (22, 32) which are respectively drilled into the first and second cylindrical blocks (2, 3) to communicate with the gap between said connection sleeves (8, 9) so as to flow cooling medium.

The second invention is a pipe fitting device comprising:

a pair of cylindrical blocks (2) in one of which a ring portion (24) projects out on a tip end of a flange (21) formed on one pipe end side;

a pair of follower rings (4) one of which is in contact with the outer circumferential surface of the ring portion (24) of one of the cylindrical blocks (2) and has a bent end portion (41) in sliding contact with each other;

a pair of springs (7) one of which pushes said pair of follower rings (4) so that said bent end portions (41) are in pressure contact with each other;

flexible connection sleeves (9, 8) which respectively connect the flanges (21) of said pair of cylindrical blocks (2) and the ring portions (24); and through holes (22) which are respectively drilled into the cylindrical blocks (2) to communicate with the gap between said connection sleeves (8, 9) so as to flow cooling medium.

The third invention is a pipe fitting device comprising:

a first cylindrical block (2) in which a ring portion (24) projects out on a tip end of a flange (21) formed on one pipe end side;

a second cylindrical block (3) which has an opening (34) incorporating with play the ring portion (24) of said first cylindrical block (2) close to the tip end of a flange (31) formed on the other pipe end side;

a follower ring (5) which is disposed between the ring portion (24) of said first cylindrical block (2) and the opening (34) of said second cylindrical block (3), in contact with the outer circumferential surface of the ring portion (24) of the first cylindrical block (2) and has a bent end portion (51) in sliding contact with a edge member end surface of the opening (34) of the second cylindrical block (3);

a spring (7) which pushes said follower ring (5) to the second cylindrical block (3) side;

a flexible connection sleeve (9) which connects the outer circumferential surfaces of said first cylindrical block (2) and the second cylindrical block (3); and water jackets (29, 39) which are respectively disposed in the cylindrical wall inside of the first and second cylindrical blocks (2, 3) so as to flow cooling medium.

When one of the above-described pipe fitting devices according to the invention is used, high temperature fluid flowing from one cylindrical block to the other can be sealed by the follower ring and further by the connection sleeve disposed thereoutside, thus preventing the fluid from leaking out of the pipe fitting device. A relative lengthwise dislocation of connected pipes is absorbed by elongation or contraction of the pipe fitting which permits both cylindrical blocks to move relatively in a lengthwise direction within the lengthwise gap provided between both blocks, when, irrespective of the relative movement of the cylindrical blocks, the follower ring is held in place by the spring, thus preventing high temperature fluid from leaking out thereof. A relative lateral dislocation perpendicular to the lengthwise direction of the pipe fitting is absorbed by the deformation of the connection sleeve which permits both cylindrical blocks to move relatively in a lateral direction within the lateral gap provided therebetween, when, following the relative movement of the cylindrical blocks, the follower ring moves relatively in the lateral direction integrally with the blocks while being held in place between the blocks in the lengthwise direction by the spring, but the bent end portion of the follower ring slides along the opening end surface of the other block or the bent end portion of the other follower ring, thus preventing high temperature fluid from leaking out thereof. Further, when the first or second invention is used, water, oil, air or other liquid or gaseous cooling medium is introduced from one of the communicating through holes into the gap between double connection sleeves to cool the connection sleeves (especially the inner sleeve) and the cylinder blocks, thus preventing them from being deteriorated by heat. When the third invention is used, water, oil, air or other liquid or gaseous cooling medium is introduced into the water jacket of the cylindrical blocks to cool the blocks and high temperature fluid, thus preventing the connection sleeve from being deteriorated by heat from the high temperature fluid.

DETAILED DESCRIPTION OF PREFERRED EMBODIMENTS

Figure 1:
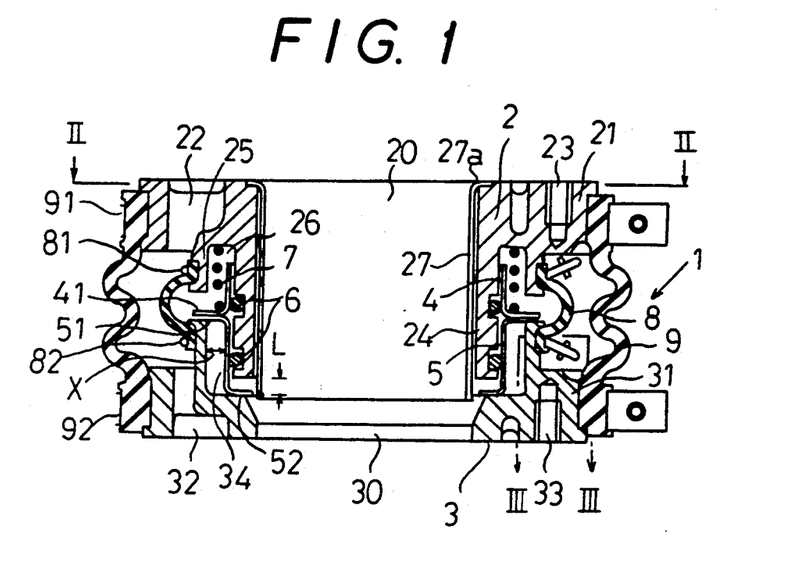
FIG. 1 is a cross sectional view of a first embodiment of a pipe fitting device according to the first invention.
Figure 2:
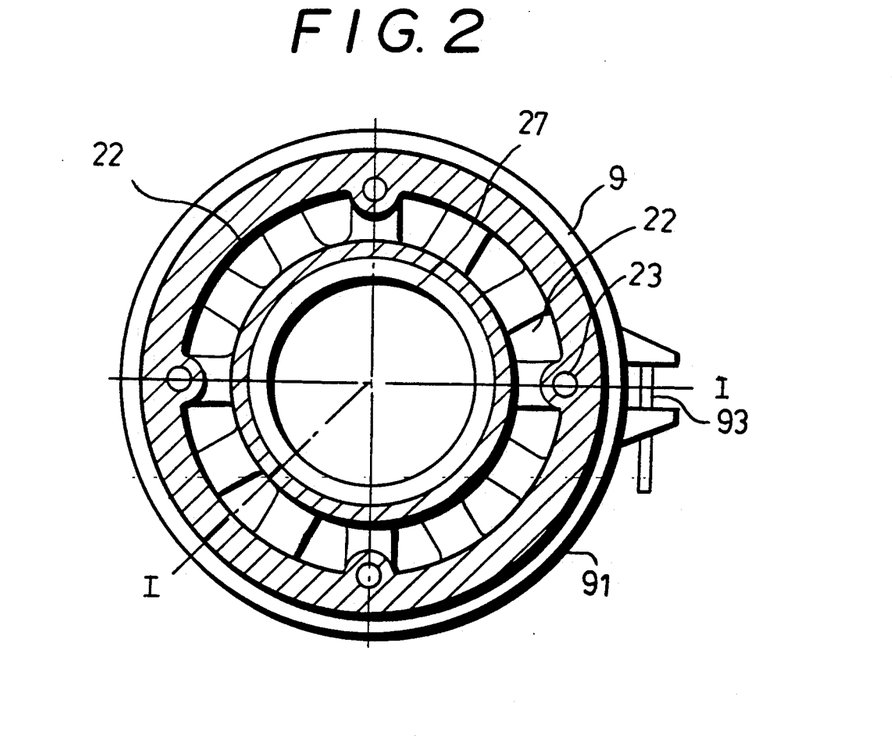
FIG. 2 is a reduced sectional view taken along Line II—II of FIG. 1.

Embodiments of a pipe fitting device according to the invention will be described referring to the accompanying drawings:

FIG. 1 is a cross sectional view of a first embodiment of a pipe fitting device according to the first invention;

FIG. 2 is a reduced sectional view taken along Line II—II of FIG. 1; and

Figure 3:
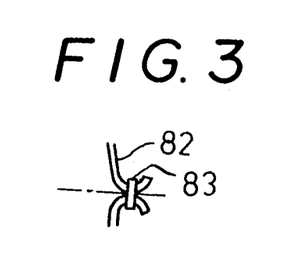
FIG. 3 is a partial sketch viewing from Line III—III in FIG. 1.

FIG. 3 is a partial sketch viewing from Line III—III in FIG. 1.

As shown in FIG. 1, the main parts of a pipe fitting device 1 are a first cylindrical block 2, a second cylindrical block 3 which is so connected to the first cylindrical block 2 that it can move relatively thereto, follower rings 4 and 5 which are in contact with the outer circumferential surface of the end portion of the first cylindrical block 2 through seal members 6, a spring 7 which pushes the follower rings 4 and 5 to the second cylindrical block 3 side, and connection sleeves 8 and 9 which connects both cylindrical blocks 2 and 3.

The first cylindrical block 2 has a through hole 20 at the center for passing high temperature fluid, and the base end side (end side to which one pipe is to be connected) is expanded radially to form a flange 21. In the flange 21, as shown in FIG. 2, a through hole 22 is drilled in the longitudinal direction, and a plurality (here, 4 pieces) of threaded holes 23 are provided to fix it with bolts to the flange of one pipe (such as exhaust gas pipe B in FIG. 4) to be connected. An end surface (lower surface) portion of the flange 21 is extended to form not only a pipe portion 24 extending the fluid passage 20 toward the end direction, but also a ring portion 25 around the pipe portion 24 with spacing therebetween, thus forming a ring groove 26 between the ring portion 25 and the pipe portion 24 to accomodate a spring 7 described later in detail.

On the other hand, the second cylindrical block 3 has a passage 30 of the same diameter as the first cylindrical block 2 for flowing high temperature fluid. The base end side is expanded in a radial direction to form a flange 31, which is provided with a lengthwise through hole 32 and a plurality (here, 4 pieces) of threaded holes 33 for fixing it with bolts to a flange of the other pipe (such as exhaust gas expansion chamber C, in FIG. 4) to be connected. The end surface (upper surface) of the flange 31 is provided with an opening 34 of a slightly larger diameter than the pipe portion 24.

One follower ring 4 has an outwardly bent end portion 41 at the end (lower end) side, and is so placed as to slide lengthwise relatively to the outer circumferential surface of the pipe portion 24 of the first cylindrical block 2 through the O-ring 6. On the other hand, the other follower ring 5 has an outwardly bent end portion 51 at the end (upper end) side, and also an inwardly bent end portion 52 at the end (lower end) side. The follower ring 5 is so place as to slide lengthwise relatively to the outer circumferential surface of the pipe portion 24 of the first cylindrical block 2 through the O-ring 6 as seal member, with the bent end portion 51 butting against the bent end portion 41 of the above follower ring 4.

Further, the end portion of the pipe portion 24 of the first cylindrical block 2 is inserted with play into the opening 34 of the second cylindrical block 3, and the spring 7 is disposed under compression between the bottom surface of the ring groove 26 of the first cylindrical block 2 and the bent end portion 41 of the follower ring 4 to push the follower rings 4 and 5 toward the second cylindrical block 3 side. Under this condition, the bent end portion 51 on the top end side of the follower ring 5 is in pressure contact with the top end surface of the opening portion 34, and the bent end portion 52 on the base end side with the bottom end surface of the opening portion 34.

The connection sleeves are formed with bellows of heat resisting rubber, and the outer connection sleeve 9 has a larger diameter and longer length than those of the inner connection sleeve 8. One end portion of the inner sleeve 8 is tightened with band 81 around the end portion of the ring portion 25 of the first cylindrical block 2, while the other end is tightened with band 82 around the end portion of the second cylindrical block 3. Both end portions of the bands 82 (and 81) are connected with fastener 83 as shown in FIG. 3. Instead of the tightening bands 81 and 82, a spring band (not shown) may be used in which both ends of a certain length of small diameter coil spring are connected in a ring shape. One end portion of the outer sleeve 9 is tightened with band 91 around the end portion of the flange 21 of the first cylindrical block 2, while the other end is tightened with band 92 around the end portion of the flange 31 of the second cylindrical block 3. Both end portions of the bands 92 (and 91) are connected with fastener 93 as shown in FIG. 2.

Numeral 27 in FIG. 1 shows a metal sleeve, which is disposed along the inner surface of the first cylindrical block 2 with a slight gap for the inner surface thereof. The base end of the metal sleeve 27 is bent outwardly, with the bent portion 27a engaged with the base end surface of the first cylindrical block 2.

Figure 4:
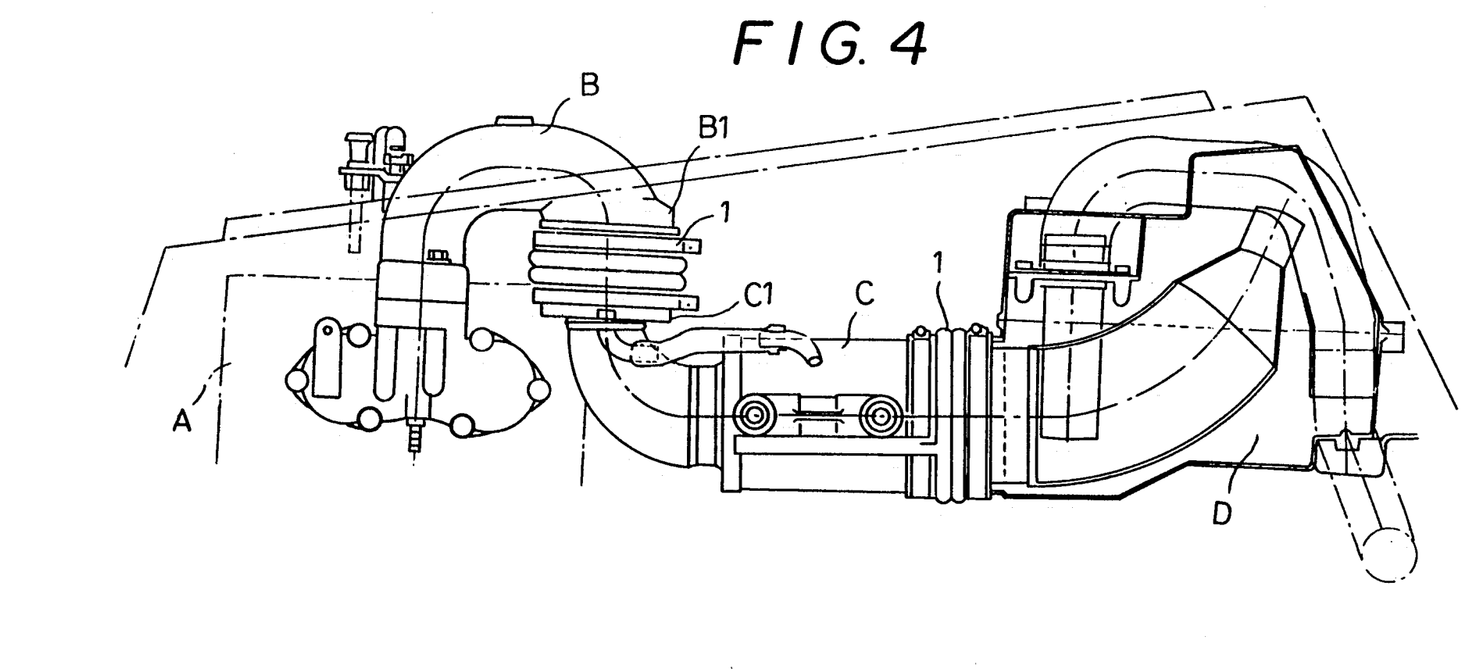
FIG. 4 is a side view showing an exhaust gas discharge system for an engine on a small watercraft provided with the pipe fitting device in FIG. 1.

Now, an embodiment of a pipe fitting device in service according to the invention will be described referring to FIG. 4 showing an engine room in a small watercraft:

Sign A shows an engine, B an exhaust gas pipe, C an exhaust gas expansion chamber, and D an exhaust gas muffler. The engine A and the exhaust gas pipe B are integrally connected, and the exhaust gas expansion chamber C and the exhaust gas muffler D are respectively fixed independently with the engine A. The pipe fitting device 1 is used for connecting the exhaust gas pipe B and the exhaust gas expansion chamber C as well as the exhaust gas expansion chamber C and the exhaust gas muffler D. Here, the pipe fitting device 1 used for connecting the exhaust gas pipe B and the exhaust gas expansion chamber C will be explained:

In FIGS. 1 and 4, the flange 21 of the first cylindrical block 2 is fixed with bolts to an outlet side flange B1 of the exhaust gas pipe B, while the flange 31 of the second cylindrical block 3 is fixed with bolts to a flange C1 of the exhaust gas expansion chamber C. Cooling water in the engine A passes through the water jacket (not shown) of the exhaust gas pipe B, then is introduced into the space between the connection sleeves 8 and 9 from the communication hole 22 of the flange 21, and finally exits from the communication hole 32 of the flange 31, thus especially preventing the inner connection sleeve 8 in the pipe fitting device 1 from being deteriorated by heat. The whole pipe fitting device 1 is also cooled by the cooling water.

When the engine A is operating, the exhaust gas pipe B vibrates integrally with the engine A, thus often causing a relative dislocation at the connection portion of the exhaust gas pipe B and the exhaust gas expansion chamber C. But, when the exhaust gas pipe B vibrates relatively to the exhaust gas expansion chamber C in a lengthwise direction of the pipe fitting device 1, the first cylindrical block 2 approaches or moves away from the second cylindrical block 3 within the range of a gap L (FIG. 1) in the lengthwise direction of both the cylindrical blocks 2 and 3, thus absorbing the vibration from the engine A, when the pipe portion 24 slides in the lengthwise direction to the two follower rings 4 and 5 which are internally in contact with the outside circumferential surface of the pipe portion 24 through the O-ring 6, thus maintaining a seal condition between the first and second cylindrical blocks 2 and 3. On the other hand, when the exhaust gas pipe B vibrates relatively to the exhaust gas expansion chamber C in a lateral direction perpendicular to the lengthwise direction of the pipe fitting device 1, the first cylindrical block 2 approaches or moves away from the second cylindrical block 3 within the range of a gap X (FIG. 1) in the lateral direction of both the cylindrical blocks 2 and 3, thus absorbing the vibration from the engine A, when, following a lateral movement of the first cylindrical block 2, the bent end portion 41 of the follower ring 4 comes in contact with the bent end portion 51 of the follower ring 5, and the bent end portion 52 of the follower ring 5 slides in contact with the bottom surface of the opening portion 34 of the second cylindrical block 3, thus maintaining a seal condition between the first and second cylindrical blocks 2 and 3.

In this connection, the embodiment disposes the seal members 6 between the first cylindrical block 2 and the follower rings 4 and 5, to provide a gap between the cylindrical block 2 and the follower rings 4 and 5, thus permitting a certain degree of initial inclination or relative inclination introduced during operation of the cylindrical blocks 2 and 3. Besides, the further use of the two flexible follower rings 4 and 5 also permits a further large degree of initial incliniation or relative inclination introduced during operation of the cylindrical blocks 2 and 3.

Figure 5:
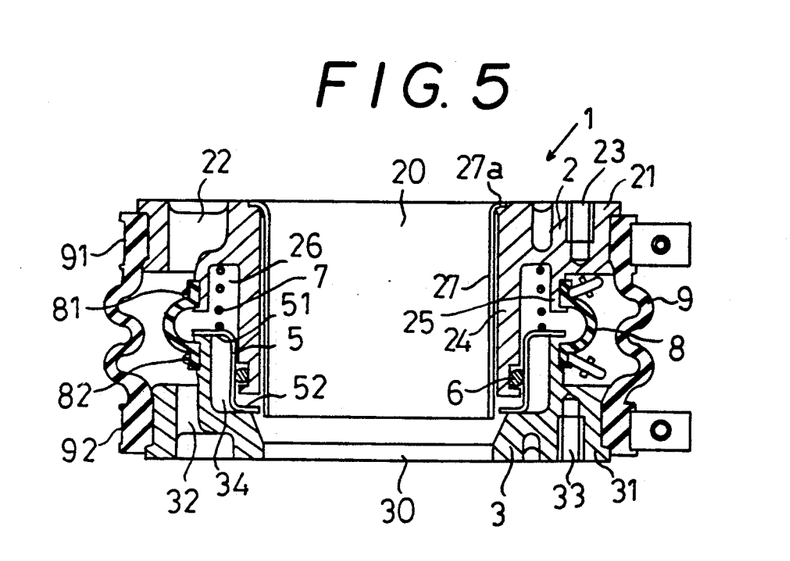
FIGS. 5 to 7 are respectively sectional views showing other embodiments of a pipe fitting device according to the first invention.
Figure 6:
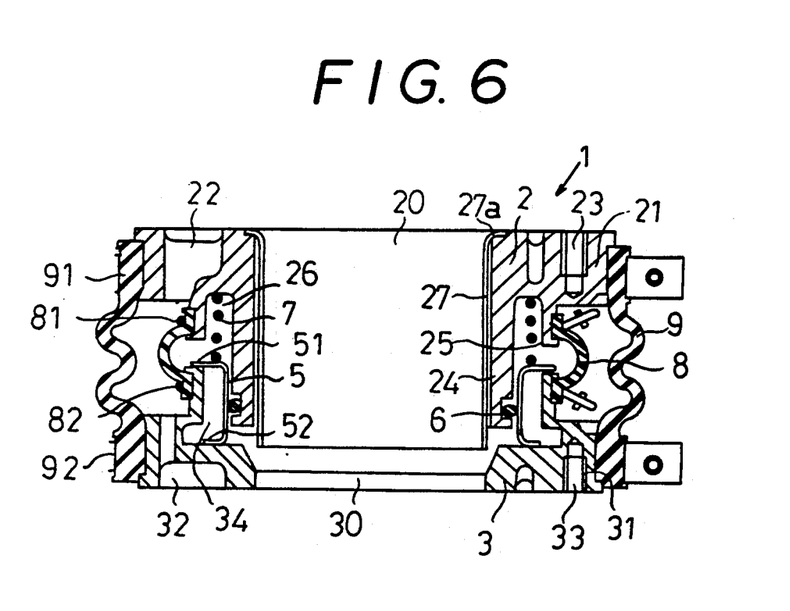
Figure 7:
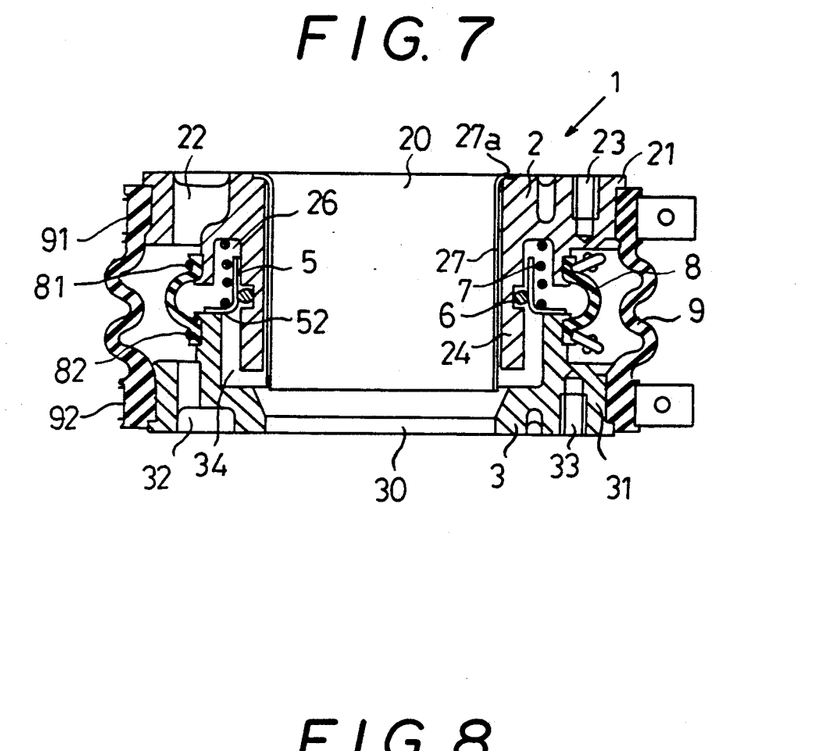

FIGS. 5 to 7 show other embodiments of a pipe fitting device 1 according to the invention:

These embodiments respectively use only one follower ring for simple configuration, but their basic configuration and function are all the same as the above-described embodiment of the pipe fitting device 1. However, when a relative lateral dislocation is large at the connection point, the previously described embodiment using two follower rings 4 and 5 has a higher sealing effect than these. In FIGS. 5 to 7, common members to those in FIG. 1 are designated by the same Numerals and Signs. The first and second blocks are formed in a cylindrical shape, but may be formed in a square shape. These embodiments respectively dispose a metal sleeve 27 in the first cylindrical block 2 to increase heat insulation, which may be omitted. The seal member 6 is not limited to an O-ring made of synthetic rubber, but metal ring such as piston ring may be used. Especially when consideration for misalignment or large relative inclination introduced during operation between the first and second blocks 2 and 3 is not required, the seal member 6 may be omitted, where the follower rings 4 and 5 are slidably disposed lengthwise with a minute gap provided around the outer circumferential surface of the pipe member 24 of the first cylindrical block 2.

Figure 8:
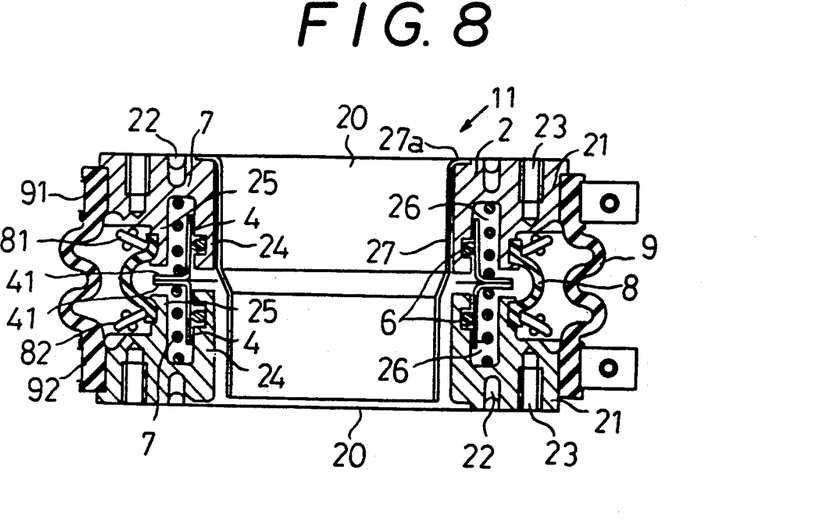
FIG. 8 is a longitudinal cross sectional view showing a midsection of an embodiment of a pipe fitting device according to the second invention.

FIG. 8 is a vertical sectional view showing the midsection of a pipe fitting device 11 according to the second invention:

The pipe fitting device 11 is mainly different from the pipe fitting device 1 according to the first invention in that: The second cylindrical block has all the same configuration as the first cylindrical block 2, and the tip end portions of both of the same cylindrical blocks 2 and 2 are faced to each other, as well as, to the pipe portions of both cylindrical blocks 2 and 2, the same follower rings 4 are internally in contact with the pipe portions of both cylindrical blocks 2 and 2 respectively through the seal members (O-ring) 6, and two follower rings are pushed to each other under pressure by the springs 7 and 7 at the midsection of the cylindrical blocks 2 and 2. The other basic configuration and function of the pipe fitting device 11 are the same with the pipe fitting device 1 according to the first invention. In FIG. 8, common members are attached with the same numerals as those in FIG. 1.

The second invention can be far inexpensive as compared to the first invention, because main parts such as cylindrical block, follower ring, and spring can use the same part.

Figure 9:
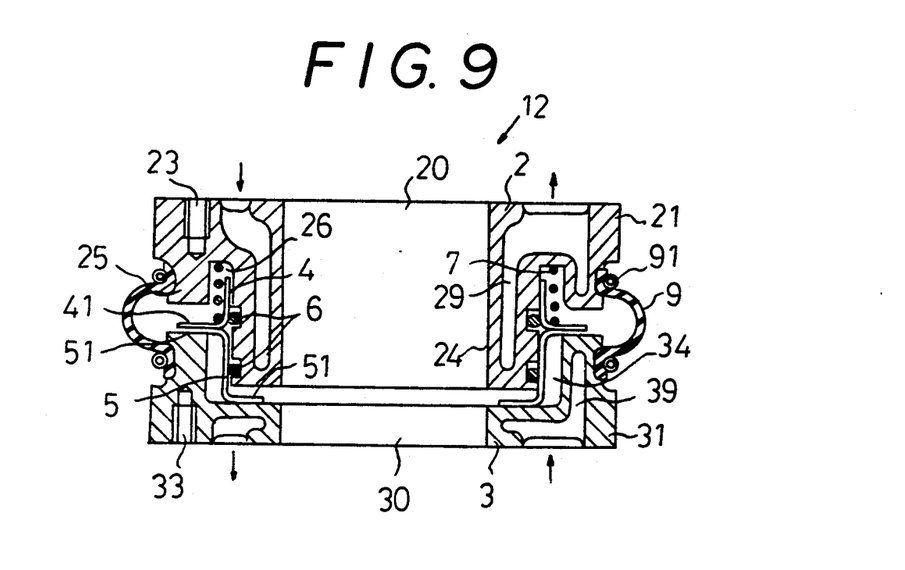
FIG. 9 is a longitudinal cross sectional view showing a midsection of an embodiment of a pipe fitting device according to the third invention.
Figure 10:
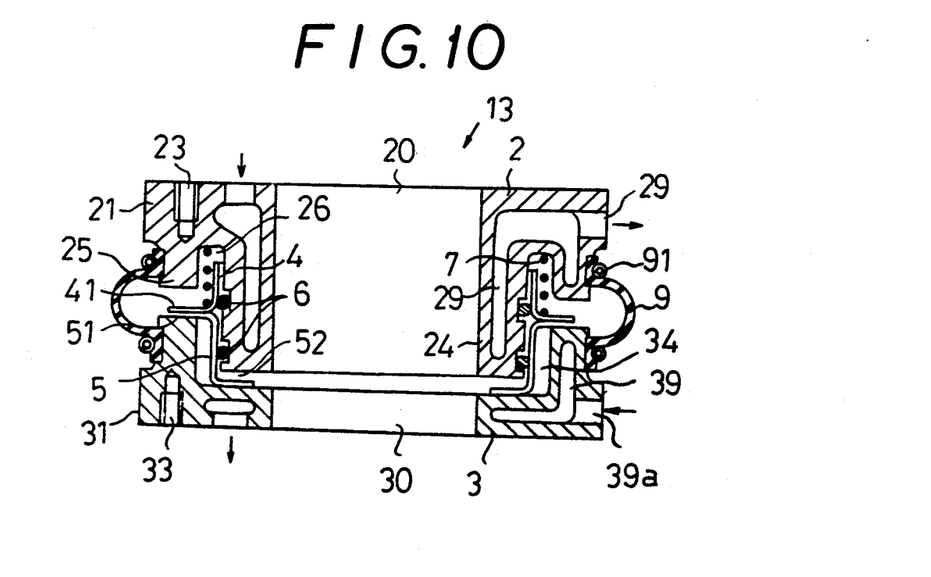
FIG. 10 is a longitudinal cross sectional view showing a midsection of another embodiment of a pipe fitting device according to the third invention.

FIGS. 9 and 10 are vertical sectional views showing the midsection of two embodiments 12 (FIG. 9) and 13 (FIG. 10) of a pipe fitting device according to the third invention:

The pipe fitting devices 12 and 13 are mainly different from the pipe fitting devices 1 and 11 according to the first and second invention in that: Water jackets 29 and 39 are formed close to the inner walls of the first and second cylindrical blocks 2 and 3, and separate cooling water is passed respectively through the water jackets 29 and 39, thereby eliminating the need for flowing cooling water at the connection portion of the first and second cylindrical blocks 2 and 3, thus requiring only one (outer) connection sleeve 9. It eliminates the need for the inner connection sleeve 8, thus resulting in simple and inexpensive configuration. The pipe fitting device 12 (FIG. 9) has flow directions opposing to each other as shown by arrows of the water entering into and exiting from the water jacket 29 in the first cylindrical block 2 and the water jacket 39 in the second cylindrical block 3, while the pipe fitting device 13 (FIG. 10) has flow directions perpendicular to each other as shown by arrows. Therefore, in the pipe fitting device 13, the exit 29a of the water jacket 29 of the first cylindrical block 2 can be easily connected by a pipe (not shown) to the inlet 39a of the water jacket 39 of the second cylindrical block 3. The other basic configuration and function are the same as those of the pipe fitting device 1 according to the first invention. In FIGS. 9 and 10, common parts are designated by the same numerals as those in FIG. 1.

The pipe fitting device according to the invention can be used not only for an exhaust gas passage in an engine, but also may be used e.g., in a steam pipe connection in a recirculation passage of superheated steam in a boiler.

As apparent from the above description, the pipe fitting device according to the invention has excellent heat durability and long service life, and can seal connection portions not to leak out high temperature fluid such as exhaust gas. And, the pipe fitting device is so short and compact that it needs a smaller space, and can absorb relative dislocation of the connected pipes in the lengthwise and lateral directions to interrupt vibration from the engine, and further can permit a certain degree of initial inclination of the pipes to be connected.

What is claimed is:

1. A pipe fitting device which passes high temperature fluid therein, and connects pipings with dynamic relative dislocation to each other of longitudinal and lateral directions, comprising:

a first cylindrical block (2) which has a cylindrical ring portion (24) having a through hole (20) at a center for passing said fluid, and a flange (21) formed on an outside of one end of said ring portion (24) facing to an end of one of said pipings;

a second cylindrical block (3) which has a flange (31) one surface thereof faces to an end of the other of said pipings, and an annular edge member defining an opening (34) incorporating with play the ring portion (24) of said first cylindrical block (2), said edge member is formed on the opposite surface of said flange (31);

a follower ring (5) which is disposed between the ring portion (24) of said first cylindrical block (2) and the edge member of the opening (34) of said second cylindrical block (3), in contact with the outer circumferential surface of the ring portion (24) of the first cylindrical block (2) and has a bent end portion (51) in sliding contact with a edge member end surface of the opening (34) of the second cylindrical block (3);

a spring (7) which pushes said follower ring (5) to the second cylindrical block (3) side;

flexible connection sleeves (9,8) which respectively connect the flanges (21,31) of said first cylindrical block (2) and the second cylindrical block (3), as well as the ring portion (24) of the first cylindrical block (2) and the edge member end portion of the opening (34) of the second cylindrical block (3); and through holes (22,32) which are respectively drilled into the first and second cylindrical blocks (2,3) to communicate with the gap between said connection sleeves (8,9) so as to flow cooling medium.

2. A pipe fitting device which passes high temperature fluid therein, and connects pipings with dynamic relative dislocation to each other of longitudinal and lateral directions, comprising:

a pair of cylindrical blocks (2) each one of which has a cylindrical ring portion (24) having a through hole (20) at a center for passing said fluid, and a flange (21) formed on the outside of one end of said ring portion (24), and opposite end of the ring portion of each cylindrical block faces to each other;

a pair of follower rings (4) one of which is in contact with the outer circumferential surface of the ring portion (24) of one of the cylindrical blocks (2) and has a bent end portion (41) in sliding contact with each other;

a pair of spring (7) one of which pushes said paid of follower rings (4) so that said bent end portions (41) are in pressure contact with each other;

flexible connection sleeves (9,8) which respectively connect the flanges (21) of said pair of cylindrical blocks (2) and the ring portions (24); and through holes (22) which are respectively drilled into the cylindrical blocks (2) to communicate with the gap between said connection sleeves (8,9) so as to flow cooling medium.

3. A pipe fitting device which passes high temperature fluid therein, and connects pipings with dynamic relative dislocation to each other of longitudinal and lateral directions, comprising:

a first cylindrical block (2) which has a cylindrical ring portion (24) having a through hole (20) at a center for passing said fluid, and a flange (21) formed on outside of one end of said ring portion (24) facing to an end of one of said pipings;

a second cylindrical block (3) which has a flange (31) one surface thereof faces to an end of the other of said pipings, and an annular edge member defining an opening (34) incorporating with play the ring portion (24) of said first cylindrical block (2), said edge member is formed on the opposite surface of said flange (31);

a follower ring (5) which is disposed between the ring portion (24) of said first cylindrical block (2) and the edge member of the opening (34) of said second cylindrical block (3), in contact with the outer circumferential surface of the ring portion (24) of the first cylindrical block (2) and has a bent end portion (51) in sliding contact with a edge member end surface of the opening (34) of the second cylindrical block (3);

a spring (7) which pushes said follower ring (4) to the second cylindrical block (3) side:

a flexible connection sleeve (9) which connects the outer circumferential surfaces of said first cylindrical block (2) and the second cylindrical block (3); and water jackets (29,39) which are respectively disposed in the cylindrical wall inside of the first and second cylindrical blocks (2,3) so as to flow cooling medium.

* * * * *